US009491157B1

(12) United States Patent
Amdahl et al.

(10) Patent No.: US 9,491,157 B1
(45) Date of Patent: Nov. 8, 2016

(54) SSL SECURED NTLM ACCELERATION

(71) Applicant: F5 Networks, Inc., Seattle, WA (US)

(72) Inventors: Saxon Carl Amdahl, Portola Valley, CA (US); Ravi Natarajan, Fremont, CA (US); Richard Roderick Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 111 days.

(21) Appl. No.: 14/498,987

(22) Filed: Sep. 26, 2014

Related U.S. Application Data

(60) Provisional application No. 61/883,924, filed on Sep. 27, 2013.

(51) Int. Cl.
  *H04L 29/06* (2006.01)
  *H04L 29/08* (2006.01)

(52) U.S. Cl.
  CPC .............. *H04L 63/08* (2013.01); *H04L 63/10* (2013.01); *H04L 67/141* (2013.01)

(58) Field of Classification Search
  CPC ...... H04L 63/08; H04L 63/10; H04L 63/141
  USPC ............................................................ 726/4
  See application file for complete search history.

(56) References Cited

U.S. PATENT DOCUMENTS

| 5,991,881 A | 11/1999 | Conklin et al. |
| 6,539,425 B1 | 3/2003 | Stevens et al. |
| 2008/0228919 A1* | 9/2008 | Doshi ..................... H04L 41/22 709/226 |
| 2010/0287227 A1 | 11/2010 | Goel et al. |
| 2010/0299451 A1 | 11/2010 | Yigang et al. |
| 2011/0185065 A1 | 7/2011 | Stanisic et al. |
| 2011/0231649 A1 | 9/2011 | Bollay et al. |
| 2011/0231652 A1 | 9/2011 | Bollay et al. |
| 2011/0231653 A1 | 9/2011 | Bollay et al. |
| 2011/0238975 A1* | 9/2011 | Amemiya ............... H04W 4/20 713/150 |
| 2012/0240184 A1 | 9/2012 | Thirasuttakorn et al. |
| 2014/0006632 A1 | 1/2014 | Evens |

(Continued)

OTHER PUBLICATIONS

International Search Report and Written Opinion for International Application No. PCT/US2014/019129, mailed on Apr. 29. 2014.

(Continued)

*Primary Examiner* — Kambiz Zand
*Assistant Examiner* — Aubrey Wyszynski
(74) *Attorney, Agent, or Firm* — John W. Branch; Lowe Graham Jones PLLC

(57) ABSTRACT

Embodiments are directed towards managing network traffic that includes SSL secured NTLM acceleration. A Packet Traffic Management Computer (PTMC) may receive a challenge sent by a server computer before the challenge is provided to a client computer. After receiving the challenge from the server computer, the PTMC may generate a cookie that at least includes a session-ID that corresponds to the client computer. The PTMC may add the cookie to the challenge before the modified challenge is forwarded to the client computer. If response is received from the client computer and it includes the same cookie that was sent with the challenge. The session-ID may be extracted from the cookie and employed to determine which server computer should receive the message. If a server computer may be determined, the PTMC may forward the message to the determined server computer.

28 Claims, 7 Drawing Sheets

(56) References Cited

U.S. PATENT DOCUMENTS

2014/0068702 A1* 3/2014 Hyndman .............. G06F 21/41
                                                            726/1
2015/0067185 A1* 3/2015 Tamblin ............ H04N 21/2407
                                                            709/231

OTHER PUBLICATIONS

Fajardo, V. I., "Open Diameter Software Architecture," Version 1.0.7, Jun. 25, 2004, 6 pages http://diameter.sourceforge.net/diameter-architecture/index.html, accessed Sep. 2, 2008.

"Deploying the BIG-IP LTM for Diameter Load Balancing" Deployment Guide, Version 1.0, Sep. 22, 2010. 21 pages.

"Respond to server depending on TCP::client_port," DevCentral Forums, accessed Mar. 26, 2010, 6 pages http://devcentral.f5.com/Default.aspx?tabid=53&forumid=5&tpage=1&v . . . .

Liu, J. et al., "Introduction to Diameter," IBM, Jan. 24, 2006, 11 pages http://www.ibm.com/developerworks/library/wi-diameter/index.html.

"Diameter (protocol)," VVikipedia.com, accessed Feb. 3, 2012, 10 pp. http://en.wikipedia.org/wiki/Diameter_(protocol).

MacVittie, Lone "Message Based Load Balancing" (F5 Technical Brief, 2010) pp. 1-9.

Official Communication for U.S. Appl. No. 13/789,386 mailed on Jan. 30, 2015.

* cited by examiner

SSL SECURED NTLM ACCELERATION

CROSS REFERENCE TO RELATED APPLICATIONS

This non-provisional patent application claims the benefit under 35 U.S.C. §119(e) of U.S. Provisional Patent Application Ser. No. 61/883,924 filed on Sep. 27, 2013, entitled "SSL SECURED NTLM ACCELERATION," which is incorporated herein by reference in its entirety.

TECHNICAL FIELD

The present invention relates generally to packet traffic management and, more particularly, but not exclusively to improving communication over a network by enabling acceleration of challenge-response authentication protocols.

BACKGROUND

High performance/high availability client-server computing systems often employ multiple application server devices. Often multiple servers are used to provide services or applications to many client devices. Network traffic management devices (e.g., load balancers) may be used to distribute client requests to one or more of the servers. Network traffic management devices (TMDs) may be arranged so the identity and/or quantity of servers available to process requests may be transparent and unknown to the client devices. Accordingly, TMDs receive client requests and forward the requests to the appropriate servers. If servers respond to client requests, they send the responses to the TMD and the TMD may forward these responses to the appropriate client devices. The TMD may maintain state information that enables the server responses to be forwarded to the appropriate client devices. In some cases, a server that is configured to communicate through a TMD may be required to authenticate connections using challenge-response protocols. Often these types of authentication protocols require a server to send a challenge message to target client devices. In some load balancing cases, there may be inefficiencies associated with processing challenge response protocols. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association with the accompanying drawings, wherein.

DETAILED DESCRIPTION

Figure 1:
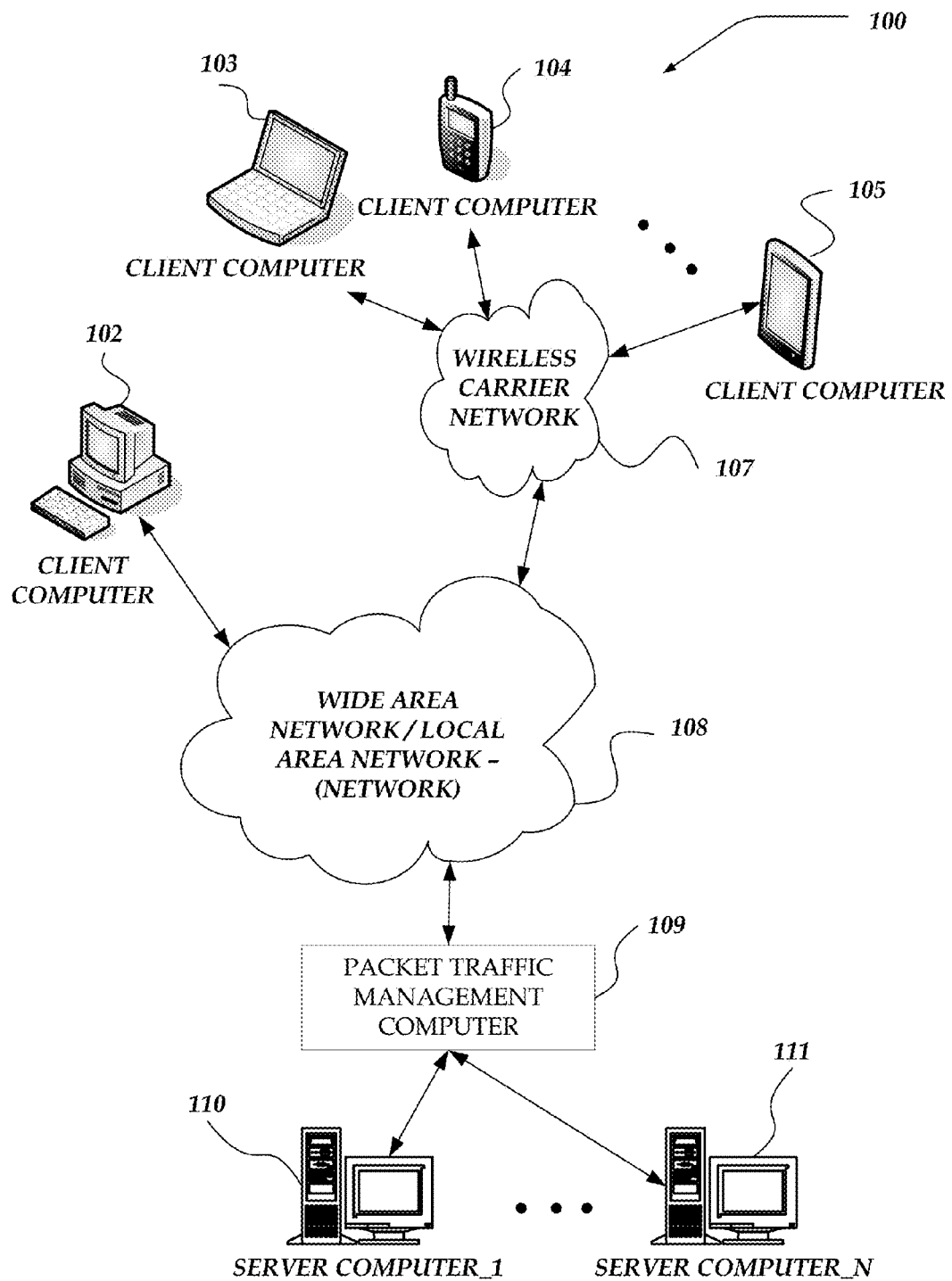
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, VLAN identifier, tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to a tuple comprising any combination of fields selected from within a network packet header, including those fields identified above.

As used herein, the terms "network flow," "connection flow,", "flow" refer to a network session that may be established between two endpoints. In at least one of the various embodiments, a tuple may describe the flow. In at least one of the various embodiments, flows may be useful if one or more of the endpoints of a network connection may be behind a traffic management computer, such as a firewall, switch, load balancer, or the like. In at least one of the various embodiments, such network flows may be used to ensure that the network packets sent between the endpoints of a flow may be routed appropriately. In at least one of the various embodiments, the performance of connection oriented network protocols such as TCP/IP may be impaired if network packets may be routed to unexpected endpoints.

As used herein, the term "session" refers to an interactive information interchange over a network between two or more endpoints or between computers and servers. One or more sessions may be established over a network between two or more computers at the beginning of the interactive information exchange. The sessions may be torn down some time after the interactive information exchange is ended. An established session may communicate one or more messages to or from each computer participating in the interactive information exchange. In some cases, a session may be stateful. Accordingly, at least one of the session participants (e.g., one of the communicating computers) needs to store information about the session history to enable the interactive information interchange. In contrast, stateless communication consists of independent request messages with responses. In some embodiments, an established session may be a basic requirement for connection-oriented communication over a network.

As used herein, the term "session-ID" refers to a value that may be correlated with a connection from a client computer. Generally, session-IDs may include values other than IP addresses. Session-IDs may be associated with an application or network protocol that is operative on each client computer and/or client session. For example, SSL communications may include a session-ID that may be generated for each SSL connection made by a client session. In some cases, a session-ID may be combined with other data, such as, IP address, passwords, or the like, to create an identifier that may be unique for each client session in a given context.

As used herein, the term "challenge-response authentication" refers to authentication protocols where a server sends a challenge message to a client expecting the client to reply with a valid and well-formed response message. Challenge messages may be arranged in various forms and may include random number strings signed/hashed with various known or shared secret values. Clients receiving communications that include challenge messages may use the challenge message content to generate a communication that includes a response message that is returned to the challenging server. If the server receives a communication that includes a response message, it may perform one or more actions to validate the response message. If the response message is validated, the connection between the client and server may be considered authenticated. In some embodiments, the challenge-response authentication protocol may be operative in addition to encryption protocols such as Secured Socket Layer (SSL), Transport Layer Security (TLS), or the like. For example, NT LAN Manager (NTLM) authentication may be considered a challenge-response authentication protocol.

As used herein, the term "connection pool" refers to a store of connections that may be available to be employed for communicating between computers over network. In at least one of the various embodiments, a traffic management computer may select from among available connections if routing/managing incoming and/or out-going communications. In some circumstances, connections may be re-used to reduce the performance costs of setting up and tearing down the under lying network and/or application connections.

As used herein, the term "shared connection pool" refers to a pool of connections that may be considered non-authenticated. Connections in a shared connection pool may be used for communications between clients and servers that may be open or non-authenticated. Generally, client requests that are forwarded to a shared connection pool may be routed to one or more servers based on policies related to load balancing, or the like.

As used herein, the term "private connection pool" refers to a pool of connections (e.g., private connections) that may route all communication from a particular client to a particular server and vice-versa. In at least one of the various embodiments, connections assigned to a shared connection pool may be re-assigned to a private connection pool if the PTMC determines that a client-server pair may be entering a communication state that requires them to be privately paired such that all of their messages are exchanged to between the same client-server pair rather than having the potential to be load balanced to different servers. For example, in at least one of the various embodiments, if a particular server issues a challenge message to a particular client, the client must send its response message to the same server that issued the challenge. Accordingly, if the client's response message is load balanced to another server, the challenge-response transaction will fail. Thus, in at least one of the various embodiments, the connection used for sending the initial challenge may be moved into a private connection pool for the client that received the challenge message and the server that sent the challenge message.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing network traffic that includes SSL secured NTLM acceleration. In at least one of the various embodiments, a Packet Traffic Management Computer (PTMC) may determine that a communication includes a challenge message that may be sent by a server computer before the challenge message is provided to a client computer. In at least one of the various embodiments, the client computer and server computer may be arranged use one or more well-known challenge and response authentication protocols, such as, NT LAN Manager (NTLM) authentication.

In at least one of the various embodiments, after receiving the challenge message from the server computer, the PTMC may generate an authentication cookie that at least includes a session-ID that corresponds to the client computer, the connection between the client computer and the server computer, the session between the client computer and the server computer, or the like.

In at least one of the various embodiments, the challenge message may be modified by the PTMC by adding the authentication cookie to the challenge message before the modified challenge message is forwarded to the client computer.

In at least one of the various embodiments, the session-ID may be comprised of the Secured Socket Layer (SSL) session-ID or a value derived using the SSL session-ID that the client computer may be using to communicate securely with the server computer and/or the PTMC.

In at least one of the various embodiments, if another message is received from the client computer and it includes the same authentication cookie that was sent with the challenge request message (or a cookie having the same value) is received by the PTMC, the PTMC may extract the session-ID from the authentication cookie. In at least one of the various embodiments, the session-ID may be employed to determine which server computer should receive the message. If a server computer may be determined, the PTMC may forward the message to the determined server computer.

In at least one of the various embodiments, the PTMC may receive a response message from the client computer that answers the modified challenge request message. In at least one of the various embodiments, the response message may also at least include the authentication cookie (or an authentication cookie having the same value) as was provided with the modified challenge request message. In at least one of the various embodiments, the response message may be forwarded to the server computer that may be determined based in part on the session-ID stored in the authentication cookie.

Illustrative Operating Environment

FIG. 1 shows components of one embodiment of an environment in which the invention may be practiced. Not all of the components may be required to practice the invention, and variations in the arrangement and type of the components may be made without departing from the spirit or scope of the invention.

As shown, system 100 of FIG. 1 includes local area networks ("LANs")/wide area networks ("WANs")–(network) 108, wireless network 107, client computers 102-105, packet traffic management computer ("PTMC") 109, and server computers 110-111. Network 108 is in communication with and enables communication between client computers 102-105, wireless network 107, and PTMC 109. Wireless carrier network 107 further enables communication with wireless devices, such as client computers 103-105. PTMC 109 is in communication with network 108 and server computers 110-111.

One embodiment of client computers 102-105 is described in more detail below in conjunction with FIG. 2. In one embodiment, at least some of client computers 102-105 may operate over a wired and/or a wireless network, such as networks 107 and/or 108. Generally, client computers 102-105 may include virtually any computer capable of communicating over a network to send and receive information, including instant messages, performing various online activities, or the like. It should be recognized that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computer capable of connecting to another computer and receiving information, such as laptop computer 103, smart phone 104, tablet computer 105, or the like. However, portable computers are not so limited and may also include other portable computers, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client computer may employ the browser application to perform various activities over a network (online). However, another application may also be used to perform various online activities.

Client computers 102-105 also may include at least one other client application that is configured to receive and/or send data between another computer. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, Mobile Identification Number ("MIN"), an electronic serial number ("ESN"), or other mobile computer identifier. The information may also indicate a content format that the mobile computer is enabled to employ. Such information may be provided in a network packet, or the like, sent between other client computers, PTMC 109, server computers 110-111, or other computers.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless carrier network 107 is configured to couple client computers 103-105 and its components with network 108. Wireless carrier network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include more than one wireless network.

Wireless carrier network 107 may further include an autonomous system of terminals, gateways, routers, and the like connected by wireless radio links, and the like. These connectors may be configured to move freely and randomly and organize themselves arbitrarily, such that the topology of wireless carrier network 107 may change rapidly.

Wireless carrier network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless carrier network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless carrier network 107 may include virtually any wireless communication mechanism by which information may travel between client computers 103-105 and another computer, network, and the like.

Network 108 is configured to couple network computers with other computers, including, server computers 110-111 through PTMC 109, client computer 102, and client computers 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMC 109 is described in more detail below in conjunction with FIG. 3. Briefly, however, PTMC 109 may include virtually any network computer capable of managing network traffic between client computers 102-105 and server computers 110-111. Such computers include, for example, routers, proxies, firewalls, load balancers, cache devices, computers that perform network address translation (NAT), or the like, or any combination thereof. PTMC 109 may perform the operations of routing, translating, switching packets, or the like. In one embodiment, PTMC 109 may inspect incoming network packets, and may perform an address translation, port translation, a packet sequence translation, and the like, and route the network packets based, at least in part, on the packet inspection. In some embodiments, PTMC 109 may perform load balancing operations to determine a server computer to direct a request. Such load balancing operations may be based on network traffic, network topology, capacity of a server, content requested, or a host of other traffic distribution mechanisms.

PTMC 109 may include control segment 318 and separate data flow segment 338. The control segment may include software-optimized operations that perform high-level control functions and per-flow policy enforcement for packet traffic management. In at least one of the various embodiments, the control segment may be configured to manage connection flows maintained at the data flow segment. In one embodiments, the control segment may provide instructions, such as, for example, a packet translation instruction, to the data flow segment to enable the data flow segment to route received packets to a server computer, such as server computer 110-111. The data flow segment may include hardware-optimized operations that perform statistics gathering, per-packet policy enforcement (e.g., packet address translations), high-speed flow caches, or the like, on connection flows and/or connection pools maintained at DFS 338 between client computers, such as client computers 102-105, and server computers, such as server computers 110-111.

Server computers 110-111 may include virtually any network computer that may operate as a website server. However, server computers 110-111 are not limited to website servers, and may also operate as messaging server, a File Transfer Protocol (FTP) server, a database server, content server, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, and/or even within a cloud architecture. Thus, the invention is not to be construed as being limited to a single environment, and other configurations, and architectures are also envisaged.

Illustrative Client Computer

Figure 2:
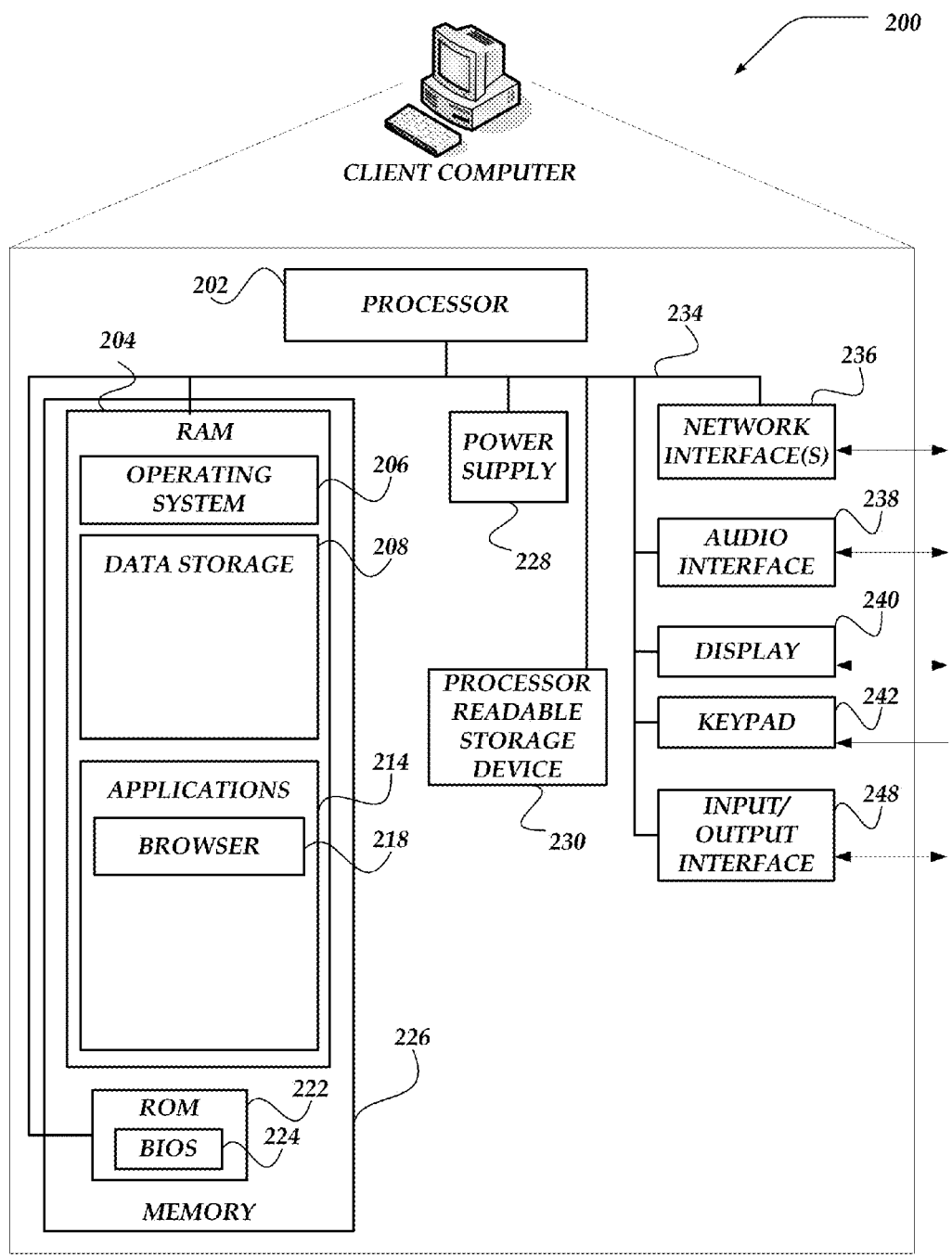
FIG. 2 shows an embodiment of a client computer that may be included in a system such as that shown in FIG. 1.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with memory 226 via a bus 234. Client computer 200 also includes a power supply 228, one or more network interfaces 236, an audio interface 238, a display 240, a keypad 242, and an input/output interface 248.

Power supply 228 provides power to client computer 200. A rechargeable or non-rechargeable battery may be used to provide power. The power may also be provided by an external power source, such as an AC adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HS-DPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client computer 200 may also include a GPS transceiver (not shown) to determine the physical coordinates of client computer 200 on the surface of the Earth. A GPS transceiver typically outputs a location as latitude and longitude values. However, the GPS transceiver can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client computer 200 on the surface of the Earth. It is understood that under different conditions, a GPS transceiver can determine a physical location within millimeters for client computer 200; and in other cases, the determined physical location may be less precise, such as within a meter or significantly greater distances. In one embodiment, however, mobile computer 200 may through other components, provide other information that may be employed to determine a physical location of the computer, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of network computer 200, including, but not limited to processor readable storage device 230, a disk drive or other computer readable storage medias (not shown) within client computer 200.

Processor readable storage device 230 may include volatile, non-transitory, nonvolatile, non-transitive, removable, and non-removable media implemented in any method or technology for storage of information, such as computer- or processor-readable instructions, data structures, program modules, or other data. Examples of non-transitory computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computer. Processor readable storage device 230 may also be referred to herein as computer readable storage media.

Applications 214 may include computer executable instructions which, when executed by client computer 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client computer. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Furthermore, in at least one of the various embodiments, application 214 may include other applications that may be enabled to employ challenge-response authentication, such as, the well-known NT LAN Manager (NTLM) authentication, including NTLM authentication over HTTP, NTLM authentication over SSL, or the like Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as PTMC 109 and/or indirectly with server computers 110-111. In at least one of the various embodiments, browser 218 may be enabled to receive and store HTTP Cookies, as well as other similar cookie-type protocols.

Illustrative Network Computer

Figure 3:
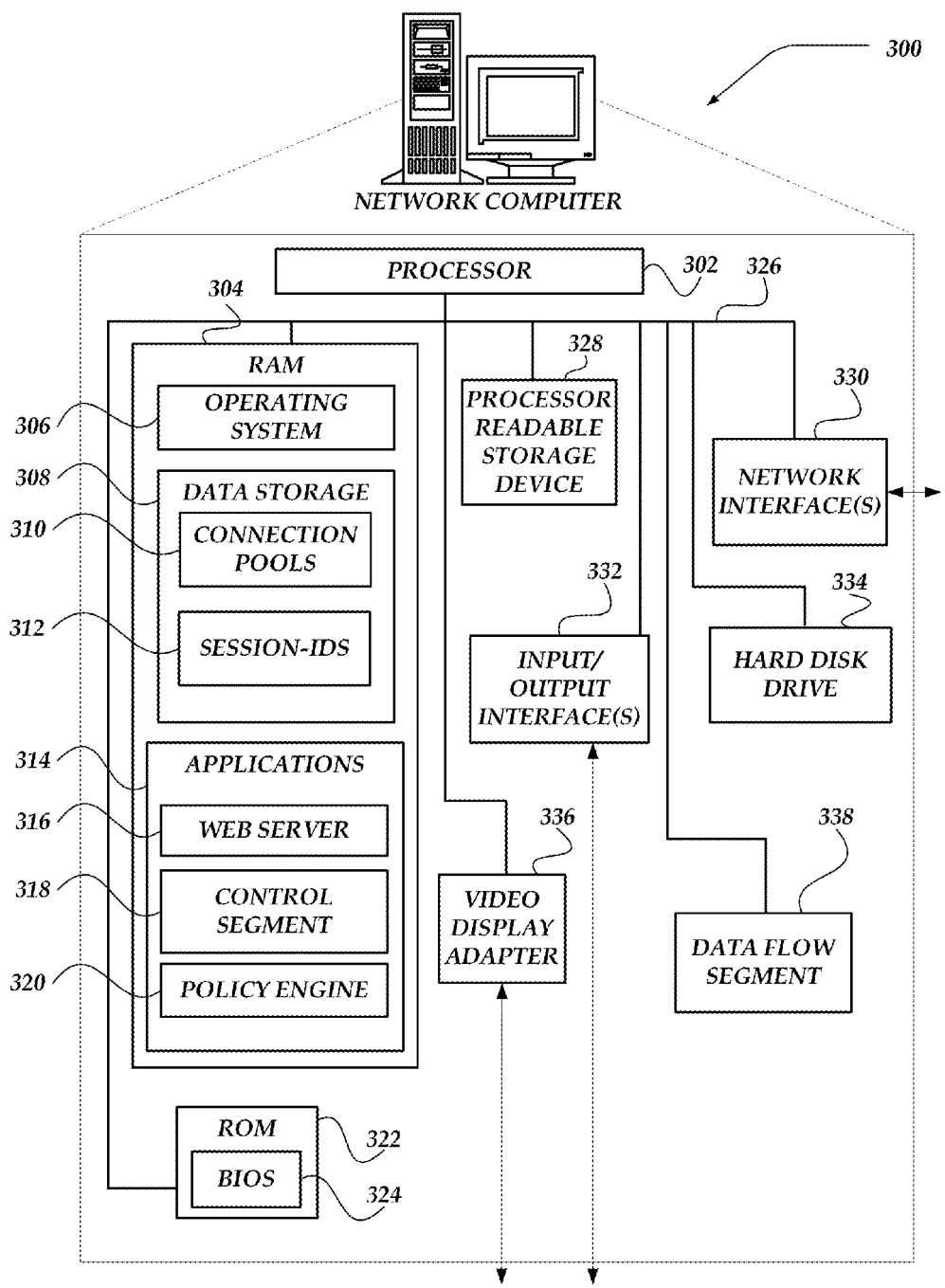
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the innovations described herein. Network computer 300 may be configured to operate as a server, client, peer, node, a host, or any other computer. Network computer 300 may represent, for example PTMC 109 of FIG. 1, server computers 110-111 of FIG. 1, and/or other network computers.

Network computer 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network computer 300. Any general-purpose operating system may be employed. Basic input/output system ("BIOS") 324 is also provided for controlling the low-level operation of network computer 300. As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit 302 to execute and perform actions. In one embodiment, at least some of data store 308 might also be stored on another component of network computer 300, including, but not limited to processor-readable storage device 328, hard disk drive 334, or the like.

In at least one of the various embodiments, data storage 308 may include storage for one or more connection pools, such as, connection pools 310, as well as storage for one or more data structures for session-IDs, such as, session-IDs 312.

The mass memory may also store program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 316 and control segment ("CS") 318 may also be included as application programs within applications 314.

Web server 316 represent any of a variety of services that are configured to provide content, including messages, over a network to another computer. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client computer, such as client computers 102-105 of FIG. 1, to browse websites, upload user data, or the like.

Network computer 300 may also include DFS 338 for maintaining connection pools and/or connection flows between client computers, such as client computers 102-105 of FIG. 1, and server computers, such as server computers 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), connection pool management, or the like, on connections and/or connection flows maintained at DFS 338. In some embodiments, DFS 338 may route, switch, forward, and/or otherwise direct packets based on rules for a particular connection flow signature (e.g., a 5 tuple of a received packet). Thus, DFS 338 may include capabilities and perform tasks such as that of a router, a switch, a routing switch, or the like. In some embodiments, the rules for a particular connection flow signature may be based on instructions received from CS 318. In one embodiment, DFS 338 may store the instructions received from CS 318 in a local memory as a table or some other data structure. In some other embodiments, DFS 338 may also store a flow state table to indicate a state of current connection flows maintained at DFS 338. In at least one of the various embodiments, components of DFS 338 may comprise and/or work in combination to provide high-speed flow caches for optimizing packet traffic management. In at least one of the various embodiments, DFS 338 may comprise high-speed memory such as SRAM to improve performance.

In at least one of the various embodiments, DFS 338 may include memory for storing one or more connection pools, such as, connection pools 310, as well as, memory for storing for one or more data structures for session-IDs, such as, session-IDs 312.

In at least one of the various embodiments, policy engine 320 may be a component arranged for processing and executing declarative policy rules. Policy engine 320 may be implemented in software or hardware, or a combination thereof.

Illustrative Logical System Architecture

Figure 4:
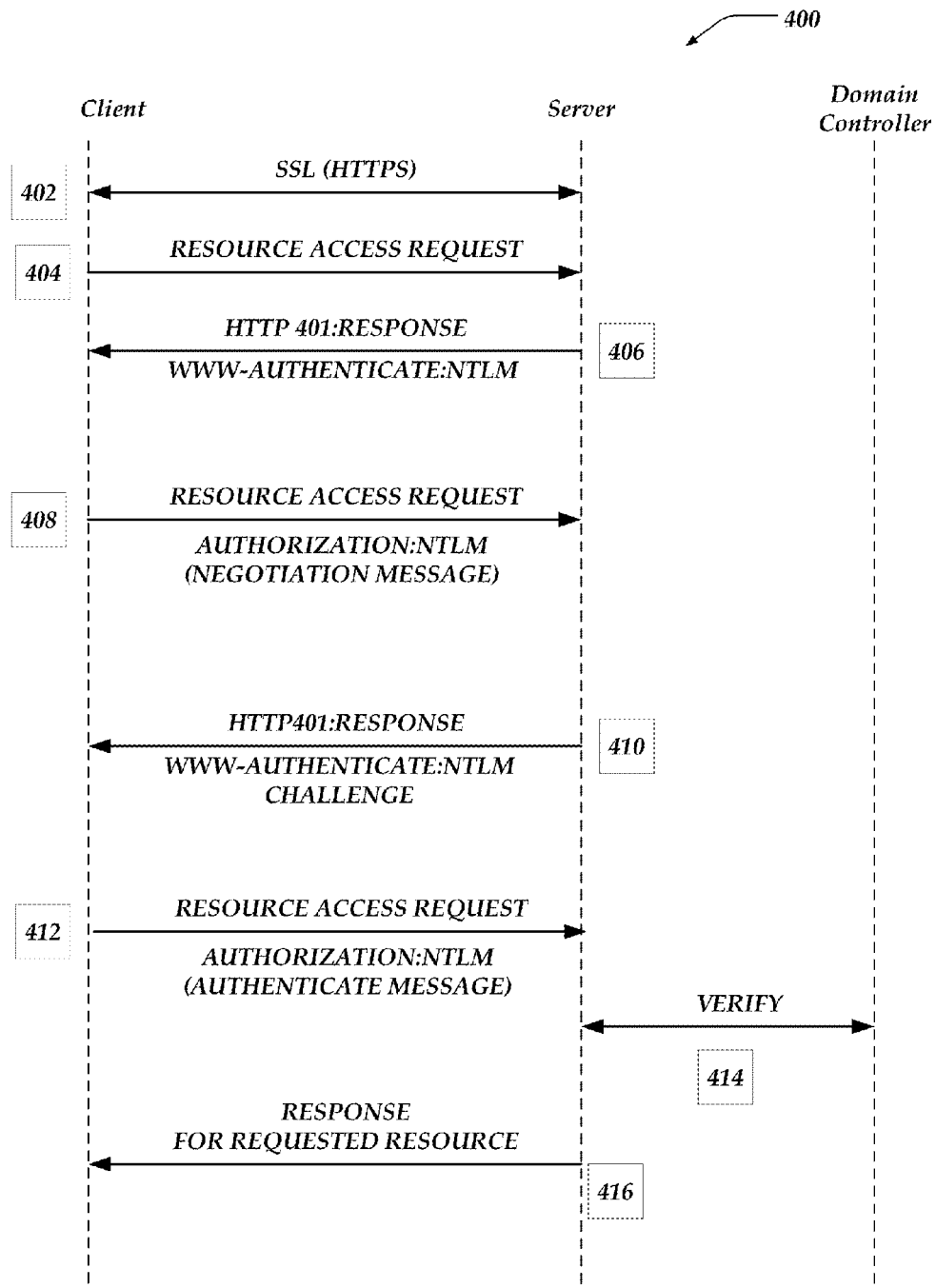
FIG. 4 illustrates a sequence diagram for challenge and response authentication in accordance with at least one of the embodiments.

FIG. 4 illustrates sequence diagram 400 for challenge and response authentication in accordance with at least one of the embodiments. Sequence diagram 400 represents a generalized example of the well-known protocol known as NTLM authentication. One of ordinary skill in the art will appreciate that sequence diagram 400 may be interpreted as generally representing other challenge and response authentication protocols.

At step 402, in at least one of the various embodiments, a client session and/or client computer may have established an SSL session with one server. The client and server may be exchanging various communications and messages over the SSL connection.

At step 404, in at least one of the various embodiments, the client may generate a resource access request to the server. In at least one of the various embodiments, a resource access request may be a request formulated to access (e.g., read, write, retrieve, copy, move, change status, communicate, or the like) a resource located and/or managed by the server. In at least one of the various embodiments, resources may include, files, directories, objects, database tables, processes, ports, or the like.

At step 406, in at least one of the various embodiments, if the resource requested by the client is a secured resource, the server may generate a response to the client that at least includes information that indicates that the resource is secured and authentication is required. For example, if NTLM protocol is used, the server may generate a response with an HTTP Status Code of 401 and a WWW-Authenticate header field that may include a value indicating that NTLM authentication may be required. The Status Code 401 may indicate that access to the requested resource is unauthorized and the WWW-Authenticate header field informs the client which authentication protocol may be required.

At step 408, in at least one of the various embodiments, after receiving the response from the server, the client may generate a request that may include information for authorizing access to the requested resource. In NTLM, for example, the client includes a HTTP Authorization header value that includes a NTLM negotiation message.

In at least one of the various embodiments, this request may include information, such as, user name, a list of authentication features available on the client, a list of authentication features requested of the server, or the like. In some embodiments, this request may be called a negotiation request, because it may include information that may be used to determine authentication features that may be acceptable and/or available to both sides of the transaction. For example, in at least one of the various embodiments, authentication requests for NTLM authentication may send the username of the user that may be requesting an authenticated connection with the server.

At step 410, in at least one of the various embodiments, the server may use information included in the negotiation request to generate a communication that includes challenge information and to provide to the client. For example, in at least one of the various embodiments, for NTLM authentication, the server may generate a 16-byte random number and provide it to the client as the challenge information. In NTLM, the challenge information may be included in the WWW-Authenticate header field. Also, a Status Code of 401 may be returned with the response indicating that access to the requested resource may be unauthorized since the challenge-response transaction is unfinished.

At step 412, in at least one of the various embodiments, the client has received the communication that includes the challenge information and may employ it to generate a communication that includes a response message that may be sent back to the same server that sent the challenge information. For example, in at least one of the various embodiments, for NTLM authentication, the client may encrypt the challenge information provided by the server with a hash of the user's password and send this encrypted result back to the server.

At step 414, in at least one of the various embodiments, the server receives the communication that includes the response message and compares the response message information to the information used to generate the challenge message. If the response message is validated, then the authentication may be considered successful. In some embodiments, where NTLM authentication may be employed, the server may use the username of the user, the challenge information that was previously sent, and the response message to attempt to authenticate the user. For example, the server may use the user name to retrieve a known hash of the user's password. This password hash may be used to encrypt the challenge information. If the challenge information encrypted by the server using the user's password matches the response sent by the client, the authentication may be considered to be successful. In at least one of the various embodiments, the server may be in communication with another computer such as a domain controller to perform the authentication. For example, in at least one of the various embodiments, the domain controller may have access to the trusted password hashes that may be used to validate the response. In other cases, the server may act as a domain controller.

At step 416, in at least one of the various embodiments, if the authentication was successful, the connection is considered authenticated and the server may generate a response for the requested resource and provide it to the client that requested access.

Figure 5:
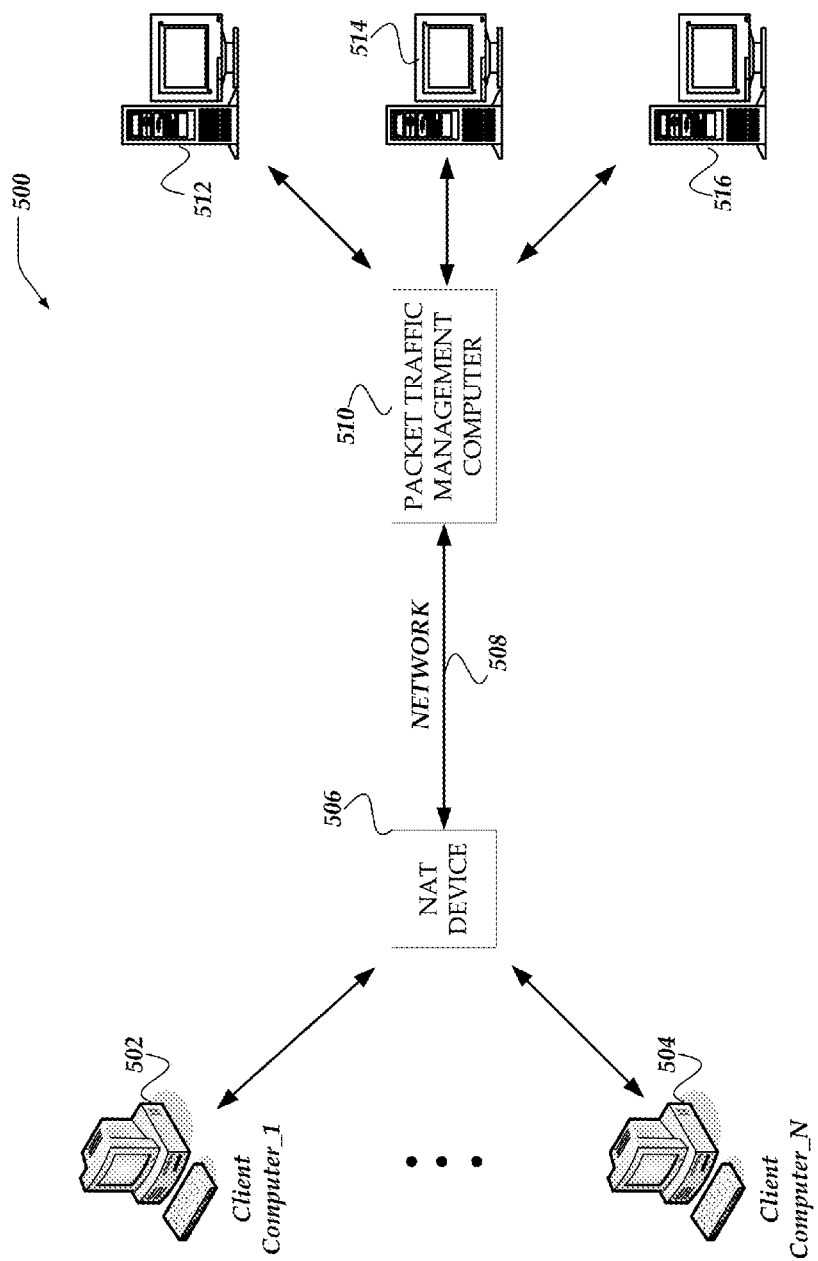
FIG. 5 illustrates a system diagram of an environment employing network address translation in accordance with at least one of the embodiments.

FIG. 5 illustrates a portion of system 500 which is an environment employing network address translation in accordance with at least one of the embodiments. In at least one of the various embodiments, one or more client computers, such as, client computer 502 and client computer 504 may be performing communication over a network through NAT device 506. In at least one of the various embodiments, NAT device 506 may be in communication over a network, such as, network 506, with PTMC 510. In at least one of the various embodiments, PTMC 510 be in communication with one or more server computers, such as, server computer 512, server computer 514, and server computer 516. In at least one of the various embodiments, NAT device 510 may be configured to provide network address translation services for the client computers such that the internal IP address of the client computers may be translated to one or more external IP addresses provided by the NAT device.

In at least one of the various embodiments, NAT may obscure which client computer originated a communication because the source network address visible to the server may be limited to the network address of NAT device 506 rather than the network address of the actual client computer that sent the communication. In at least one of the various embodiments, NAT may make it difficult for PTMC 510 to discern how to route communications that include challenge-response messages.

In at least one of the various embodiments, other features of client applications and/or network protocols may be leveraged by the PTMC to identify and/or differentiate client computers that may be hidden behind a NAT device. For example, in at least one of the various embodiments, if client computers and server computers are using SSL protocols to communicate, the PTMC may be arranged to track connections in part using the SSL session-ID shared by a the client and servers connection pair.

Figure 6:
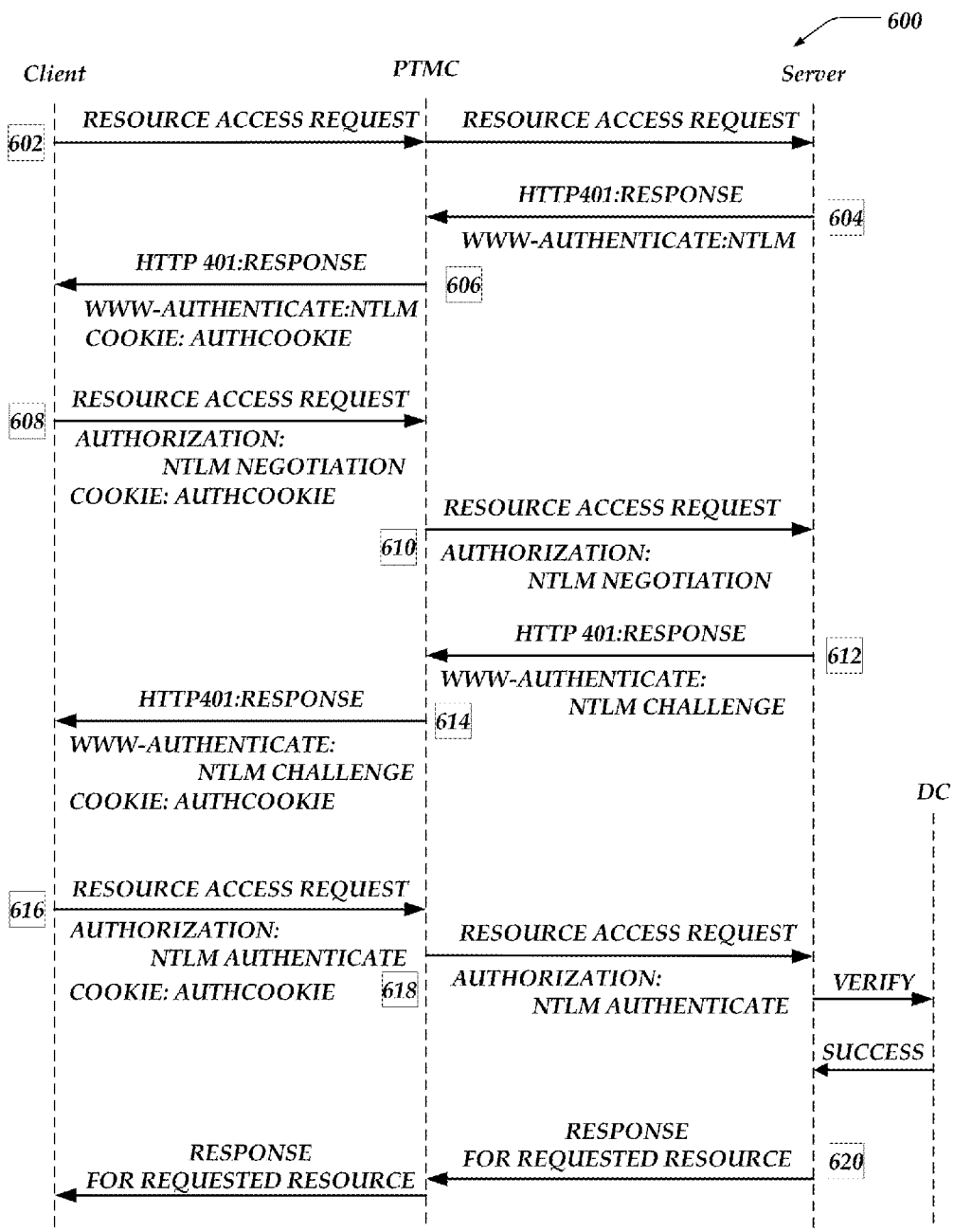
FIG. 6 illustrates a sequence diagram for SSL secured NTLM acceleration in accordance with at least one of the embodiments.

FIG. 6 illustrates sequence diagram 600 for SSL secured acceleration for challenge and response authentication in accordance with at least one of the embodiments. Sequence diagram 600 represents a generalized example using the well-known challenge and response protocol known as NTLM authentication. One of ordinary skill in the art will appreciate that sequence diagram 600 may be interpreted as generally representing other challenge and response authentication protocols.

At step 602, in at least one of the various embodiments, a client may generate a resource access request that may be intercepted by a PTMC. In at least one of the various embodiments, the PTMC may forward the resource access request to a server.

In at least one of the various embodiments, the PTMC may be placed on a network such that it may determine communications based on observing, monitoring, and/or intercepting some or all of the network communication traffic between the one or more client computers and the one or more server computers. Further, in at least one of the various embodiments, the PTMC may be arranged and/or configured to monitor a SSL handshake as it occurs between the client computers and the PTMC to enabling the PTMC to store one or more well-known SSL handshake parameters/components for each SSL connection enabling the PTMC to decrypt the SSL communications that may pass through the PTMC.

In any event, in at least one of the various embodiments, one or more of the applications running on the client computers and in communication with applications on the server computers may exchange secure messages and/or communications over one or more SSL connections.

Further, in at least one of the various embodiments, the PTMC may be managing communications between one or more client computers and one more server computers using connections that may be associated with a shared connection pool.

In at least one of the various embodiments, connections that may be associated with a shared connection pool may be configured such that the received communications and/or requests for service from client computers may be load-balanced to one of a plurality of server computers. In at least one of the various embodiments, various rule based policies may be employed by the PTMC to determine how and if communications should be load-balanced and to which server computer they should go to.

In at least one of the various embodiments, communications from a client computer may be forwarded to different server computers over different connections associated with the shared connection pool, depending on the policy rules that may be in effect on the PTMC. For example, referring to FIG. 5, client computer 502 may communicate a request to PTMC 510 for one or more services that may be offered by each of server computers, server computer 512, server computer 514, and/or server computer 516. Based on operative policy rules PTMC 510 may determine which server computer from among server computer 512, server computer 514, and server computer 516 to forward the request. Policies enforced by the policy rules may be as simple as rotating requests from one server computer to the next in sequential order (e.g., round-robin). Other policy rules may route requests to server computers based on the content of the communication, or based on real-time load profiles of the available server computers (e.g., a rule may preferentially route requests to under-utilized server computers), or the like. In at least one of the various embodiments, there may be an arbitrary number of policies that may be enforced by one or more policy rules.

At step 604, in at least one of the various embodiments, a server may determine the requested resource access requires further authentication. Thus, it may generate a response directed towards the client and intercepted by PTMC indicating that additional authentication may be required. For NTLM, the server response may include the HTTP Status Code of 401 (Unauthorized) and a WWW-Authenticate header value indicating the NTLM protocol may be used for authentication.

At step 606, in at least one of the various embodiments, if the PTMC determines that a server computer may be sending a communication that includes an authentication request, the PTMC may determine that a challenge and response authentication transaction may be pending. In at least one of the various embodiments, challenge and response authentication protocols may include one or more flags and/or indicators in communications that may be used to determine if the communication may include an authentication request messages that may require subsequent challenge messages or response messages, or the like. For example, in at least one of the various embodiments, a server computer using NTLM authentication protocol may include one or more defined values in the communication that the PTMC may observe and employ to determine that the communication may be part of challenge response transaction, such as, the inclusion of a NTLM indicator in the WWW-Authenticate HTTP header field.

At step 606, in at least one of the various embodiments, the PTMC may generate an authentication cookie is associated with the client computer and add it to the information comprising the communication provided by the server computer. In at least one of the various embodiments, when the authentication cookie is added to the message information, the PTMC may forward the modified communication, including the authentication cookie, to the client computer that may be requesting access to the secure resource.

In at least one of the various embodiments, the PTMC may generate an authentication cookie based in part on a session-ID that may be associated with the client computer that requested the secured resource. In at least one of the various embodiments, the authentication cookie may be compatible with one or more well-known cookie protocols, such as, HTTP cookies protocol, or the like. Also, in at least one of the various embodiments, in addition to the session-ID, the authentication cookie may be comprised of the IP address of the client computer, a random number, time date strings, connection pool identifiers, or the like, or combination thereof. In at least one of the various embodiments, the authentication cookie may be encrypted to obscure its contents to systems other the PTMC.

In at least one of the various embodiments, the PTMC may insert the generated authentication cookie into the communication from the server computer that includes the challenge-response initiation message before the communication may be provided to the client computer that requested the secured resource.

In at least one of the various embodiments, the session-ID included in the authentication cookie may be a SSL session-ID that may be associated with the client computer and the PTMC. In at least one of the various embodiments, the SSL session-ID may enable a client computer to be identified even if the client computer may be communicating from behind a NAT device. The SSL session-ID that may be included in the authentication cookie enables the PTMC to differentiate between the different client computers that may be operative behind devices/routers/switches that may be implementing NAT.

In at least one of the various embodiments, the session-ID included in the authentication cookie may be associated with the connection used for communicating between the client computer and the server computer. In at least one of the various embodiments, the PTMC one or more well-known data structures may be used for managing the association between the client computer, server computer, connection, private connection, private connections pools, or the like, including, hashes, arrays, lists, graphs, databases, or the like, or combination thereof. In at least one of the various embodiments, the data structures that includes the relevant data (e.g., connection/client/server/cookie information) may be stored in data storage 308, and/or data flow segment 338, or the like.

In at least one of the various embodiments, if HTTP used as the communication protocol between the client computer, PTMC, and the server computer, the authentication cookie may be added as an HTTP Cookie before the communication is forwarded to the client computer that requested access to the secured resource.

At step 608, in at least one of the various embodiments, the client may make another resource access request that includes protocol information that may be required by the challenge-response protocol as well as the authentication cookie. In at least one of the various embodiments, this access request that includes the protocol information may be intercepted by the PTMC or otherwise provided to the PTMC.

In at least one of the various embodiments, after receiving the response from the server, the client may generate another request message that includes information for authorizing access to the requested resource. In at least one of the various embodiments, the information included in this request message may include, user name, a list of authentication features available on the client, a list of authentication features requested of the server, or the like. In some embodiments, this request may be called a negotiation request, because it may include information that may be used to determine authentication features that may be acceptable and/or available to both sides of the transaction. For example, in at least one of the various embodiments, authentication requests for NTLM authentication may send the username of the user that may be requesting an authenticated connection with the server. Accordingly, for this non-limiting example, if the NTLM protocol is used, the client includes an HTTP Authorization header value that includes a NTLM negotiation message.

At step 610, in at least one of the various embodiments, the PTMC may receive the request message from the client. In at least one of the various embodiments, in addition to the resource request, the request message may include any protocol negotiation information, and the authentication cookie.

In at least one of the various embodiments, the PTMC may validate the authentication cookie. In at least one of the various embodiments, the authentication cookie may be validated by comparing the session ID, client IP address, time values, or the like to the values in the cookie.

In at least one of the various embodiments, if the authentication cookie is validated, the connection used to send the resource request communication may be converted to a private connection and moved from a shared connection pool to a private connection pool.

In at least one of the various embodiments, the PTMC may be arranged to group/associate connections into one or more connection pools. Shared connection pools may be used to load balance server requests among a plurality of server computers. In contrast, private connection pools may be connection pools that include private connections that pair an individual client computer with an individual/particular server computer. In at least one of the various embodiments, private connection pools may include a single private connection that connects (e.g., over a network) a single client computer and a single server computer. In other cases, private connection pools may include one or more private connections, with each private connection connecting the same client-server computer pair.

Thus, in at least one of the various embodiments, if a communication arrives at a connection associated with a private connection pool, the PTMC may forward the communication to the same server computer each time (rather than load balancing to possible other server computers based on policy rules) using a private connection.

In at least one of the various embodiments, the server computer that initiates a challenge-response transaction with a client computer may be expecting to receive an appropriate response message from that client computer. Accordingly, if the client computer's response message is routed, or load-balanced, to another server computer, such as, a server computer that did not initiate the challenge-response transaction messages, the client computer's response message may be unexpected and may lead to a failed authentication, reauthorization, or other error conditions.

In at least one of the various embodiments, if there may be an existing private connection pool for the client computer and the server computer that sent the response, the connection may be converted to a private connection by moving it to the existing private connection pool. Otherwise, in at least one of the various embodiments, the PTMC may generate a new private connection pool and associate it with the client computer receiving the challenge message and the server computer that sent the challenge message and then convert the connection to a private connection by moving the connection to the generated private connection pool.

In at least one of the various embodiments, if a private connection pool may be established, the PTMC may remove the authentication cookie from the message information and forward the message to the server computer that initiated the challenge-response protocol transaction (at step 604 of the sequence) on the established private connection.

At step 612, in at least one of the various embodiments, the server computer may generate a challenge message targeted for the client computer requesting access to the secured resource. In at least one of the various embodiments, the server computer may employ some or all of the information provided by the client computer to generate a challenge and/or challenge information in accordance with the challenge-response protocol being employed. For example, if NTLM is being used, the challenge information may be generated as described in step 410 of FIG. 4.

At step 614, in at least one of the various embodiments, the client computer may be provided the challenge message from the server computer. Also, in at least one of the various embodiments, the client computer may receive the authentication cookie that was generated by the PTMC.

In at least one of the various embodiments, the client computer may generate a response message that is compatible with the challenge-response protocol that is being employed and send it to the server. The response message may be arranged include a copy of the authentication cookie that was provided to the client computer in step 614, in addition to information that may be required by the challenge-response protocol. For example, if NTLM protocol is being used, the response message may include information as described in step 412 of FIG. 4 with the authentication cookie included as a HTTP Cookie.

At step 618, in at least one of the various embodiments, if the authentication cookie included in the communication from the client computer may be validated by the PTMC, the PTMC may be arranged to remove the authentication cookie from the response message before providing the response message to the server computer. In at least one of the various embodiments, the response message may be provided to the server computer using the private connection, ensuring that the server computer that generated the challenge message may receive the response message from the client computer.

In at least one of the various embodiments, if the server computer receives the response message it may be validated based on the challenge-response protocol currently being employed. In at least one of the various embodiments, the particular composition of the response message may vary depending on the requirements and/or design of the particular authentication protocol that is being used. In at least one of the various embodiments, if NTLM is being used, actions similar to those described for step 412 and step 414 of FIG. 4 may be performed.

At step 620, in at least one of the various embodiments, if the response message may be validated by the server computer, the server computer may generate a response for the requested resource. In at least one of the various embodiments, the PTMC may intercept the response from the server and provide it to the client computer making the request. In at least one of the various embodiments, the PTMC may add an authentication cookie to the resource response message before it is sent to the client computer.

Generalized Operations

Figure 7:
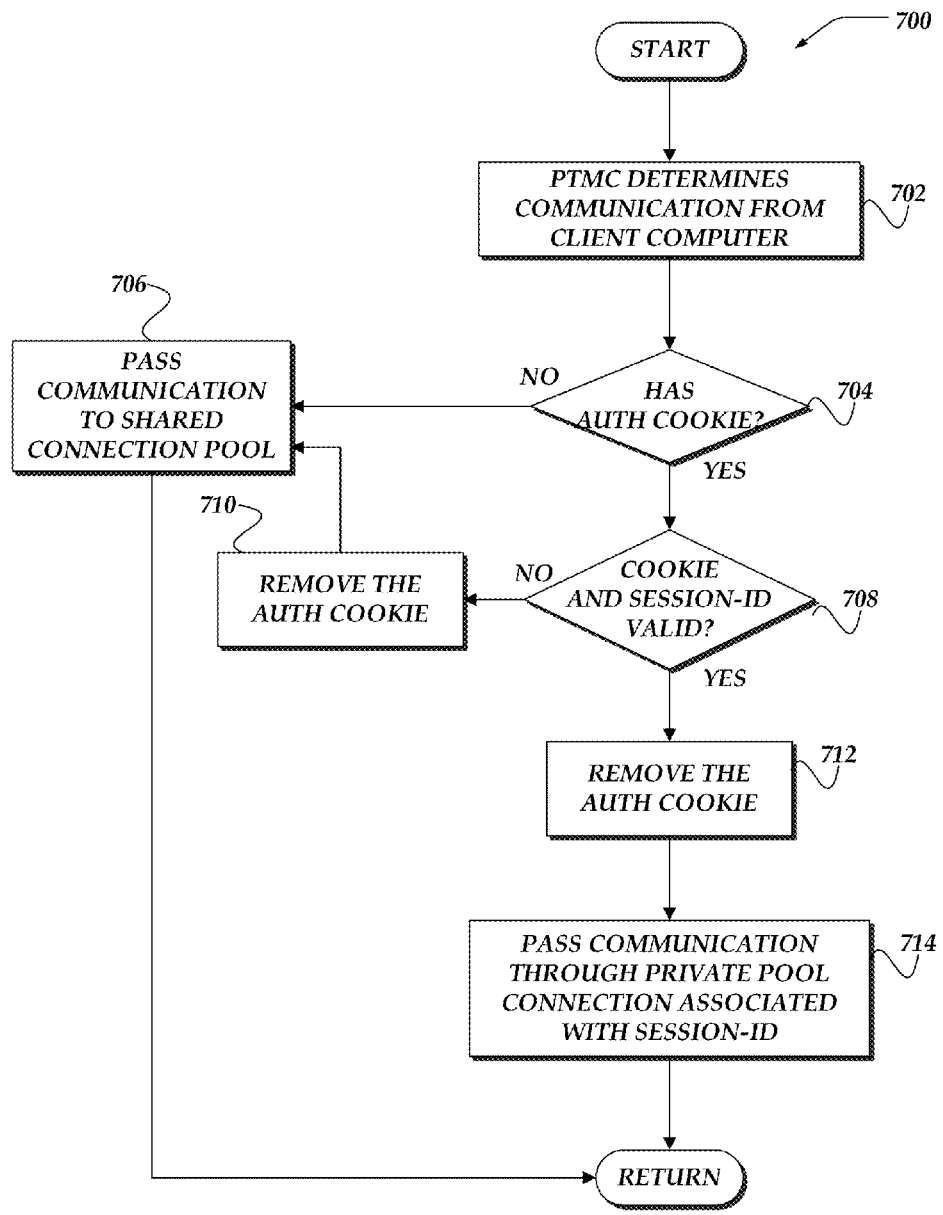
FIG. 7 shows a flowchart for a process for communicating using SSL secured NTLM acceleration in accordance with at least one of the embodiments.

FIG. 7 represents the generalized operations for SSL secured NTLM acceleration in accordance with at least one of the various embodiments. In at least one of the various embodiments, process 700 described in FIG. 7 may be implemented by and/or executed on a single network computer, such as network computer 300 of FIG. 3. In other embodiments, these processes or portions thereof may be implemented by and/or executed on a plurality of network computers, such as network computer 300 of FIG. 3, client computer 200 of FIG. 2, or the like. However, embodiments are not so limited, and various combinations of network computers, client computers, virtual machines, or the like may be utilized. Further, in at least one of the various embodiments, the processes described in conjunction with FIG. 7 may be operative in traffic management computers, systems, sequences, and/or architectures, such as, those described in conjunction with FIGS. 1-6.

FIG. 7 shows a flowchart for process 700 for communicating for SSL secured NTLM acceleration in accordance with at least one of the embodiments. After a start block, at block 702, in at least one of the various embodiments, the PTMC may determine communications from a client computer that may be directed towards one or more server computers. In at least one of the various embodiments, communications may be determined based on intercepting, monitoring, and/or observing network communication. In at least one of the various embodiments, the PTMC may be enabled to examine various aspects of the communications, including, source and destination addresses, TCP/UDP port value, application information, session-ID, HTTP cookies, SSL-session-ID, HTTP headers, or the like, or combination thereof.

At decision block 704, the PTMC may determine if the communication from the client computer includes an authentication cookie, if an authentication cookie may be found, control may flow to block decision block 708; otherwise, in at least one of the various embodiments, control may flow to block 706

At block 706, in at least one of the various embodiments, the PTMC may pass the communication to a connection associated with the shared connection pool. In at least one of the various embodiments, this may result in the communication being load balanced to a server computer based on one or more policy rules that may be operative on the PTMC. In at least one of the various embodiments, since the communication does not include an authentication cookie, other information that may be included in the communication (e.g., tuples) may be used to identify a shared connection pool for handling the communication.

At decision block 708, in at least one of the various embodiments, if the authentication cookie and the session-ID included with the authentication cookie are valid, control may flow to block 712; otherwise, in at least one of the various embodiments, control may flow to block 710.

In at least one of the various embodiments, the PTMC may decrypt the authentication cookie and extract the session-ID. In at least one of the various embodiments, the authentication cookie may be validated by verifying the session ID, client IP address, time values, or the like. If the authentication cookie may be verified the session ID may be authenticated. In at least one of the various embodiments, the session-ID may be a SSL-session-ID associated with the client computer that sent the communication. In at least one of the various embodiments, if the PTMC determines that session-ID matches the session-ID associated with a private connection then it may assume that the private connection should be used for this authenticated communication.

In at least one of the various embodiments, session-ID change may occur because an application on the client computer (e.g., a web browser) has initiated a session renegotiation. For example, in at least one of the various embodiments, some SSL client applications may be configured to renegotiate a SSL session several times an hour. However, if the SSL session may be renegotiated, resulting in a new SSL session-ID, the challenge-response authentication may remain valid. Thus, to maintain the mapping between the private connection and the session-ID after a SSL session renegotiation occurs, the PTMC may maintain historical session-ID information sufficient to associate the new session-ID with the private connection pool.

In at least one of the various embodiments, the PTMC may be managing the session level protocol. For example, the PTMC may be the SSL endpoint for a secured session with the client computer. In this case, the PTMC may be responsible for generating and providing the session-ID to the client computer. In some embodiments, the PTMC may generate session-IDs using a well-known formula such as incrementing the previous session-ID by a known value. In at least one of the various embodiments, the PTMC may retain the previous session-IDs and associate both the new session-ID and previous session-IDs with the same private connection.

In at least one of the various embodiments, an application running on a client computer may establish more than one secured connection to the PTMC for the same server application. If these connections are directed to a challenge-response authenticated connection (e.g., a NTLM authenticated connection), the PTMC may be arranged to associate the separate client session-IDs to the same authenticated connection to reduce overhead that may be caused by the additional challenge-response transaction.

In at least one of the various embodiments, if a server computer may be operating as a SSL endpoint (rather the PTMC), during session renegotiation the PTMC may monitor the SSL handshake and associate a new session-ID that may be generated with the previous session-ID to maintain the association with the private connection and the client computer. Thus, in at least one of the various embodiments, if a communication is received having the new session-ID the PTMC may identify and/or lookup the private connection as necessary.

In at least one of the various embodiments, the PTMC may be arranged to maintain a list of session-IDs for each authenticated connection enabling the accommodation of multiple client connections.

At block 710, in at least one of the various embodiments, since the communication includes an invalid or unverified authentication cookie and/or session-ID, the authentication cookie may be removed from the communication before forwarding to the shared connection pool. Accordingly, process control may flow to block 706.

At block 712, in at least one of the various embodiments, the authentication cookie may be removed from the communication before forwarding it to the private connection pool. Next, process control may flow to block 714.

At block 714, in at least one of the various embodiments, the PTMC may provide the communication from the client computer to the server computer over the authenticated connection that may be associated with session-ID. In at least one of the various embodiments, the PTMC may employ the authentication cookie to determine the private connection pool and/or the server computer for the communication. In at least one of the various embodiments, the PTMC may remove the authentication cookie from the communication before forwarding it to the determined server computer. Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing communication for a plurality of computers with one or more traffic management computers (PTMCs) that performs actions, comprising:
    providing an access denied message from a server computer to a client computer, wherein the access denied message includes an authentication cookie that at least includes a session-ID that corresponds to the client computer;
    when a negotiation message from the client computer that is directed to the server computer is provided to the one or more PTMCs, performing further actions, including:
        establishing a private connection between the one or more PTMCs and the server computer;
        associating the private connection with the session-ID;
        providing the negotiation message to the server computer over the private network connection;
        obtaining, over the private network connection a challenge message provided by the server computer, wherein the challenge message includes one or more portions of the negotiation message;
        providing the challenge message to the client computer, wherein the challenge message includes the authentication cookie; and
    when a response message that includes another authentication cookie is determined to correspond with the client computer, perform further actions, including:
        extracting the session-ID from the other authentication cookie;

determining the private connection between the client computer and the server computer based on the session-ID; and employing the private connection to forward the response message to the server computer to enable the server computer to authenticate the private connection.

2. The method of claim 1, further comprising, removing the other authentication cookie from the response message before the response message is forwarded to the server computer.

3. The method of claim 1, wherein the negotiation message, the challenge message, and the response message are compatible with NT LAN Manager (NTLM) authentication.

4. The method of claim 1, further comprising, generating the session-ID based on at least one of a connection between the client computer and the one or more PTMCs, a session between the client computer and the server computer, or a Secure Socket Layer (SSL) session-ID.

5. The method of claim 1, further comprising, when an application executing on the client computer establishes one or more connections to the same server application executing on the server computer, associating another session-ID for each of the one or more connections with the authenticated private connection.

6. The method of claim 1, further comprising, when a communication from the client computer omits the authentication cookie, forwarding the communication to one of a plurality of server computers using a connection from a shared connection pool.

7. The method of claim 1, further comprising, when one or more values that comprise the authentication cookie change or one or more values that comprise the other authentication cookie change:

generating a new authentication cookie based on the changed values; and associating the new authentication cookie with the private connection.

8. A network computer for managing communication for a plurality of computers over a network, comprising:

a transceiver that communicates over the network;

a memory that stores at least instructions;

one or more processor devices that execute instructions that perform operations, including:

providing an access denied message from a server computer to a client computer, wherein the access denied message includes an authentication cookie that at least includes a session-ID that corresponds to the client computer;

when a negotiation message from the client computer that is directed to the server computer is provided to the network computer, performing further actions, including:

establishing a private connection between the network computer and the server computer;

associating the private connection with the session-ID;

providing the negotiation message to the server computer over the private network connection;

obtaining, over the private network connection a challenge message provided by the server computer, wherein the challenge message includes one or more portions of the negotiation message;

providing the challenge message to the client computer, wherein the challenge message includes the authentication cookie; and when a response message that includes another authentication cookie is determined to correspond with the client computer, perform further actions, including:

extracting the session-ID from the other authentication cookie;

determining the private connection between the client computer and the server computer based on the session-ID; and employing the private connection to forward the response message to the server computer to enable the server computer to authenticate the private connection.

9. The network computer of claim 8, wherein the one or more network computer processor devices execute instructions that enable operations, further comprising, removing the other authentication cookie from the response message before the response message is forwarded to the server computer.

10. The network computer of claim 8, wherein the negotiation message, the challenge message, and the response message are compatible with NT LAN Manager (NTLM) authentication.

11. The network computer of claim 8, wherein one or more network computer processor devices execute instructions that enable operations, further comprising, generating the session-ID based on at least one of a connection between the client computer and the network computer, a session between the client computer and the server computer, or a Secure Socket Layer (SSL) session-ID.

12. The network computer of claim 8, wherein the one or more network computer processor devices execute instructions that enable operations, further comprising, when an application executing on the client computer establishes one or more connections to the same server application executing on the server computer, associating another session-ID for each of the one or more connections with the authenticated private connection.

13. The network computer of claim 8, wherein the one or more network computer processor devices execute instructions that enable operations, further comprising, when a communication from the client computer omits the authentication cookie, forwarding the communication to one of a plurality of server computers using a connection from a shared connection pool.

14. The network computer of claim 8, wherein the one or more network computer processor devices execute instructions that enable operations, further comprising, when one or more values that comprise the authentication cookie change or one or more values that comprise the other authentication cookie change:

generating a new authentication cookie based on the changed values; and associating the new authentication cookie with the private connection.

15. A processor readable non-transitory storage media that includes instructions for managing communication for a plurality of computers over a network, wherein a network computer that executes at least a portion of the instructions performs operations, comprising:

providing an access denied message from a server computer to a client computer, wherein the access denied message includes an authentication cookie that at least includes a session-ID that corresponds to the client computer;

when a negotiation message from the client computer that is directed to the server computer is provided to the network computer, performing further actions, including:
  establishing a private connection between the network computer and the server computer;
  associating the private connection with the session-ID;
  providing the negotiation message to the server computer over the private network connection;
  obtaining, over the private network connection a challenge message provided by the server computer, wherein the challenge message includes one or more portions of the negotiation message;
  providing the challenge message to the client computer, wherein the challenge message includes the authentication cookie; and
when a response message that includes another authentication cookie is determined to correspond with the client computer, perform further actions, including:
  extracting the session-ID from the other authentication cookie;
  determining the private connection between the client computer and the server computer based on the session-ID; and
  employing the private connection to forward the response message to the server computer to enable the server computer to authenticate the private connection.

16. The media of claim 15, further comprising, removing the other authentication cookie from the response message before the response message is forwarded to the server computer.

17. The media of claim 15, wherein the negotiation message, the challenge message, and the response message are compatible with NT LAN Manager (NTLM) authentication.

18. The media of claim 15, further comprising, generating the session-ID based on at least one of a connection between the client computer and the network computer, a session between the client computer and the server computer, or a Secure Socket Layer (SSL) session-ID.

19. The media of claim 15, further comprising, when an application executing on the client computer establishes one or more connections to the same server application executing on the server computer, associating another session-ID for each of the one or more connections with the authenticated private connection.

20. The media of claim 15, further comprising, when a communication from the client computer omits the authentication cookie, forwarding the communication to one of a plurality of server computers using a connection from a shared connection pool.

21. The media of claim 15, further comprising, when one or more values that comprise the authentication cookie change or one or more values that comprise the other authentication cookie change:
  generating a new authentication cookie based on the changed values; and
  associating the new authentication cookie with the private connection.

22. A system arranged for managing communication for a plurality of computers over a network, comprising:
  a network computer, including:
    a transceiver that communicates over the network;
    a memory that stores at least instructions;
    one or more processor devices that execute instructions that perform operations, including:
      providing an access denied message from a server computer to a client computer, wherein the access denied message includes an authentication cookie that at least includes a session-ID that corresponds to the client computer;
      when a negotiation message from the client computer that is directed to the server computer is provided to the network computer, performing further actions, including:
        establishing a private connection between the client computer and the network computer;
        associating the private connection with the session-ID;
        providing the negotiation message to the server computer over the private network connection;
          obtaining, over the private network connection a challenge message provided by the server computer, wherein the challenge message includes one or more portions of the negotiation message;
        providing the challenge message to the client computer, wherein the challenge message includes the authentication cookie; and
      when a response message that includes another authentication cookie is determined to correspond with the client computer, perform further actions, including:
        extracting the session-ID from the other authentication cookie;
        determining the private connection between the client computer and the server computer based on the session-ID; and
        employing the private connection to forward the response message to the server computer to enable the server computer to authenticate the private connection; and
  the client computer, comprising:
    a transceiver that communicates over the network;
    a memory that stores at least instructions;
    one or more processor devices that execute instructions that perform operations, including:
      communicating at least the negotiation message and the challenge message to the server computer.

23. The system of claim 22, wherein the one or more network computer processor devices execute instructions that perform operations, further comprising, removing the other authentication cookie from the response message before the response message is forwarded to the server computer.

24. The system of claim 22, wherein the negotiation message, the challenge message, and the response message are compatible with NT LAN Manager (NTLM) authentication.

25. The system of claim 22, wherein the one or more network computer processor devices execute instructions that perform operations, further comprising, generating the session-ID based on at least one of a connection between the client computer and the network computer, a session between the client computer and the server computer, or a Secure Socket Layer (SSL) session-ID.

26. The system of claim 22, wherein the one or more network computer processor devices execute instructions that perform operations, further comprising, when an application executing on the client computer establishes one or more connections to the same server application executing on the server computer, associating another session-ID for each of the one or more connections with the authenticated private connection.

27. The system of claim 22, wherein the one or more network computer processor devices execute instructions that perform operations, further comprising, when a communication from the client computer omits the authentication cookie, forwarding the communication to one of a plurality of server computers using a connection from a shared connection pool.

28. The system of claim 22, wherein the one or more network computer processor devices execute instructions that perform operations, further comprising, when one or more values that comprise the authentication cookie change or one or more values that comprise the other authentication cookie change:
- generating a new authentication cookie based on the changed values; and
- associating the new authentication cookie with the private connection.

* * * * *